Nov. 20, 1934.   A. HAXTON   1,981,550
MACHINE THREAD MILLER
Filed Oct. 24, 1933   2 Sheets-Sheet 1
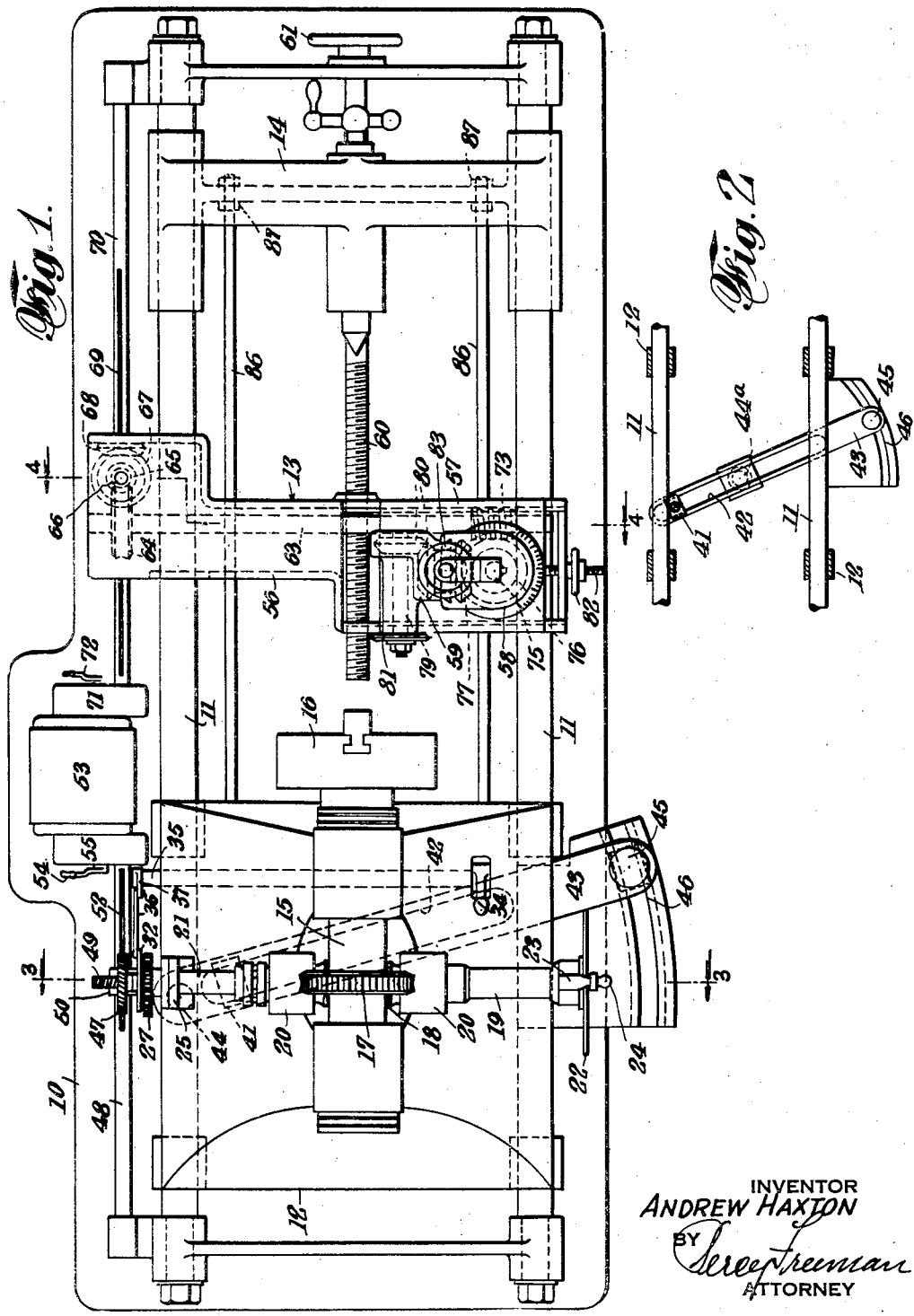

Nov. 20, 1934.  A. HAXTON  1,981,550
MACHINE THREAD MILLER
Filed Oct. 24, 1933   2 Sheets-Sheet 2
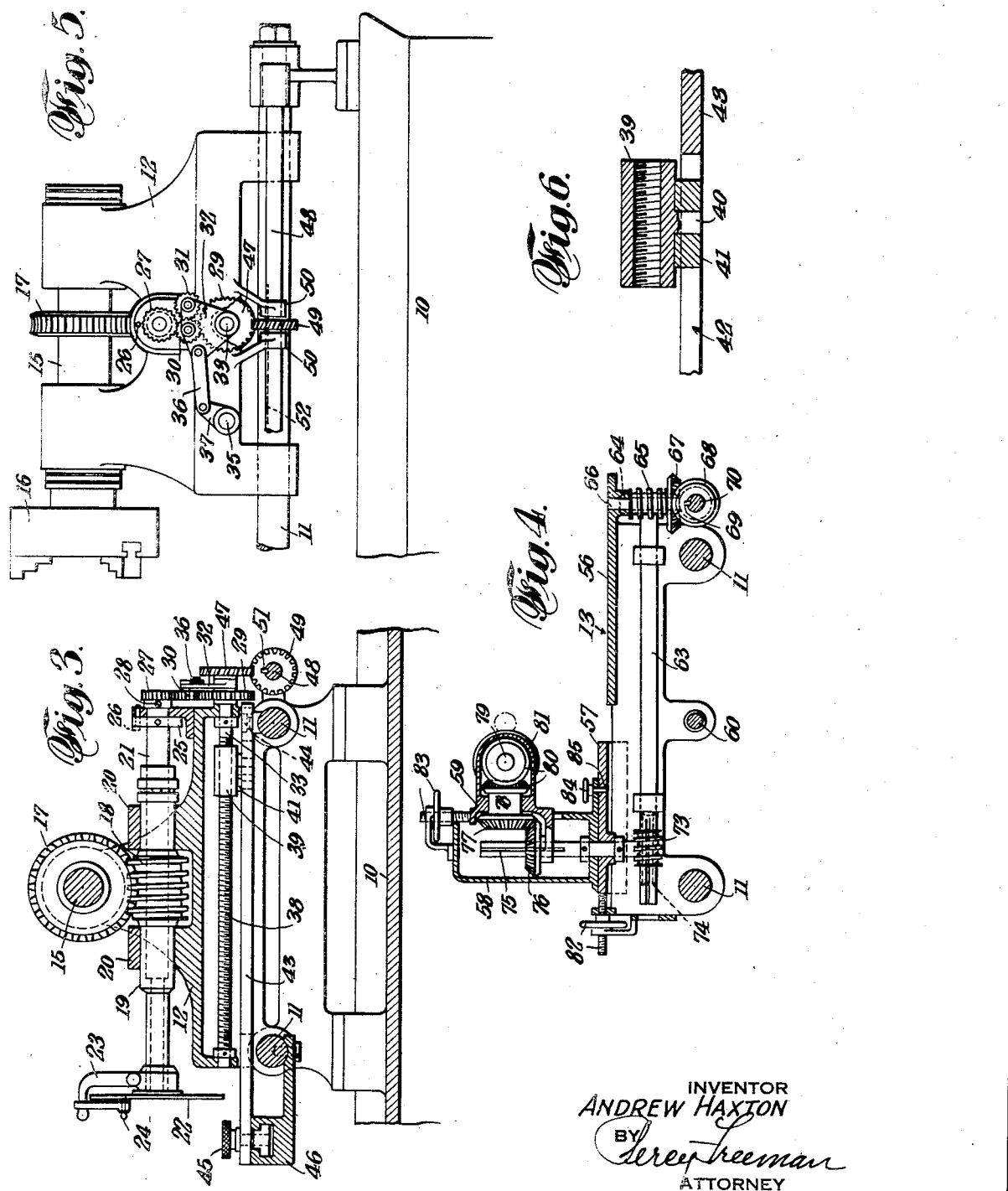
INVENTOR
ANDREW HAXTON
BY
ATTORNEY Patented Nov. 20, 1934

1,981,550

UNITED STATES PATENT OFFICE 1,981,550

MACHINE THREAD MILLER

Andrew Haxton, Tappan, N. Y.

Application October 24, 1933, Serial No. 694,943

5 Claims. (Cl. 90—15)

The present invention relates to machine tools and more particularly to a machine adapted to cut screw threads and for milling, reaming, taper threading, etc.

Heretofore, thread cutting, that is, the number of threads per inch, was determined by a lead screw which was changed for each screw of different pitch. In mass production, this is a desirable manner of operation, but when a small quantity of, say several hundred similar threads are to be cut, the lead screw type of machine does not practically apply. Then it was necessary to either thread by hand with a die or cut the threads on a lathe with all the attending time loss and unevenness of the finished work.

This invention therefore contemplates a machine which is adapted to cut any conceivable pitch and shape of thread quickly, accurately and simply; a machine adapted for use in experimental shops, tool rooms, die casting shops as well as in production shops. Its extreme flexibility adapts it for use all over the world, since it may cut threads in the English measurement and the metric measurement with equal facility.

An object of the invention is to provide a machine in which the work piece is carried by a carriage having a pre-settable arm and slide which control the feed of the work piece in relation to the cutter.

Another object is to provide gearing on the carriage to determine the right or left hand rotation of the work piece.

Fig. 1 is a plan view of a machine designed in accordance with the invention.

Fig. 2 is a plan section to a small scale of an alternate form of carriage advancing slide.

Fig. 3 is a cross sectional view as taken along the line 3—3 of Fig. 1.

Fig. 4 is a similar view as taken along the line 4—4 of Fig. 1.

Fig. 5 is a fragmentary rear view of the work carriage.

Fig. 6 is a fragmentary sectional detail of the feed slide.

Since the drawings illustrate merely an embodiment of the invention, the exact details there shown may be varied considerably. However, for the purposes of this disclosure, the machine comprises a bed 10 of usual design having guides 11 for a work carriage 12, a tool support 13 and a tail stock 14.

The work carriage supports a work spindle 15 provided with a chuck 16 and a worm gear 17. This gear is driven from a worm 18 on the cross spindle 19 mounted in bearings 20 on the carriage. Within the spindle 19 is arranged a cross shaft 21 having at one end an index plate 22. The spindle is provided with an arm 23 which carries a detent 24 selectively engageable in index holes in the plate 22.

The other end of the shaft 21 is provided with a fixed collar 25 having means such as shown at 26 to hold the shaft 21 fixed. A gear 27 is secured to this shaft by means such as the set screw 28. This gear is adapted to be driven by a gear 29 through the pinion 30 or through the pinions 30 and 31 as required.

The pinions 30 and 31 are carried on a plate 32 arranged to rock on the shaft 33 upon which the gear 29 is mounted and this plate may be rocked by a hand lever 34 on the shaft 35 through the medium of a link 36 and an arm 37.

The shaft 33 is provided with a screw thread 38 engageable by a nut 39 having a stud 40 in the slide 41. The slide 41 is slidably engaged in a long slot 42 of the lever 43. One end of this lever is pivoted to a fixed portion of the machine as at 44 and the other end is provided with means such as 45 with which it may be adjustably fixed in the segments 46 having proper calibrations (not shown).

The shaft 33 carries means such as the gear 47 whereby it may be driven from a back shaft 48 by means of the gear 49. Means such as the brackets 50 on the carriage 12 may be provided so the gear 49 at all times moves with the carriage. The gear 49 is provided with a key 51 and the shaft 48 with a key way 52 to effect a drive therebetween.

The shaft 48 is driven by a motor 53 and its speed may be regulated by manipulation of the handle 54 controlling gears in the box 55.

The cutter support 13 comprises a main slide 56, a cross slide 57 thereon, a rotatably adjustable post 58 on the cross slide and a vertical slide 59 on the post. The main slide is adjustable along the guides 11 by means of the screw 60 having the hand wheel 61. The main slide is provided with a cross shaft 63 at one end of which is carried a worm gear 64 driven by a worm 65 on a stud shaft 66 having the bevel gear 67. This bevel is driven by another bevel gear 68 slidably keyed at 69 to the back shaft 70. Change gearing in the box 71 and controlled by the lever 72 determines the speed at which the motor 53 will drive the shaft 70.

The shaft 63 carries, through a slidable key, a worm 73 in mesh with a worm wheel 74 on the vertical shaft 75. This shaft is carried by the cross slide 57 and extends into the post 58 where it is key-slotted for a bevel gear 76 carried by the vertical slide 59. Meshing with the bevel gear 76 is another bevel gear 77 on the stub shaft 78 which drives the cutter shaft 79 through the medium of gearing 80. The cutter 81 is mounted at the end of the shaft 79.

The cross slide 57 is adjustable as by the means 82 and the vertical slide is similarly adjustable by means such as at 83.

The post 58 may be rotatably adjusted by proper insertion of the detent 84 in one of a series of holes 85 in the cross slide.

The work carriage 12 and tail stock 14 may be arranged to move together along the guides 11 by means of the tie rods 86 which may be disconnected as at 87 when the tail stock is not in use.

In operation, the machine is set for cutting threads, as follows: The lever 34 is set for right or left hand rotation of the work, the lever 54 is set for the required speed of the work spindle feed, the lever 72 is set for the cutter speed and the lever 43 arranged in the segment 46 to determine the forward travel of the carriage.

The drive to the work is now as follows: motor 53, gear box 55, back shaft 48, gear 49, gear 47, shaft 33, (which feeds the nut 39 along the slot 42 of the lever 43 which gives the carriage 12 forward travel) gear 29, pinion 30, gear 27, shaft 21, plate 22, detent 24, arm 23, spindle 19, worm 18, worm wheel 17 and work spindle 15.

Should reverse direction of the work spindle be required the lever 34 is moved to mesh the pinion 31 with the gear 27 and the drive at this point is from gear 29, pinion 30, pinion 31, to gear 27.

The cutter drive is as follows: motor 53, gear box 71, back shaft 70, bevel gears 68, 67, worm 65, worm wheel 64, cross shaft 63, worm 73, worm wheel 74, shaft 75, bevel gearing 76, 77, stub shaft 78, bevel gears 80, cutter spindle 79, cutter 81.

The above describes the machine as arranged to cut screw threads. Should it be required to cut gear teeth, the set screw 28 is withdrawn so the gear 27 does not drive the shaft 21 and the means shown at 26 is employed to hold the shaft 21 fixed. In this manner the only rotation of the work spindle 15 is attained by the manual setting of the detent 24 in the proper holes in the index plate 22.

The cutter 81 is now arranged parallel to the axis of the machine by proper setting of the post 58 on the cutter support. Now, as the carriage feeds forward, the work moves by the cutter to attain a mill cut in a manner well known.

When the work is too long for safe support in the chuck, the tail stock may be used to support it at its over hanging end.

The lever 43 may be pivoted at its approximate center as shown at 44a (Fig. 2) and in this manner approximately double the feed of the carriage 12 may be attained with the same angulation of the lever 43.

From the foregoing it will be seen that a simple device for the purpose has been disclosed in the preferred form of its embodiment, but it is not desired to restrict the details to the exact construction shown, it being obvious that changes, not involving the exercise of invention, may be made without departing from the scope of the appended claims.

Having thus described my invention, what I claim as new and desire to secure by Letters Patent, is:

1. In a machine tool having a rotating cutter, means to progressively index a piece of work in relation to the cutter comprising a shaft, an index plate on the shaft, a spindle co-axial with the shaft, a settable detent on the spindle selectively engageable with the index plate, a worm on the spindle, a worm wheel meshing with the worm and a work spindle fixed with the worm wheel.

2. In a machine tool having a work carriage and a rotatable cutter, means to progressively advance the carriage with respect to the cutter, means to rotate the work, means to rotate the cutter, a motor to drive the several means, selective gear means to control the speed of the carriage and independent selective gear means to drive, and control the speed of the cutter, and means to vary the rate of advancement of the carriage.

3. In a machine tool having a rotating cutter, a work carriage, means to progressively index a piece of work in relation to the cutter, comprising a shaft, an index plate on the shaft, a spindle coaxial with the shaft, a settable detent on the spindle selectively engageable with the index plate, a worm on the spindle, a worm wheel meshing with the worm, a work spindle fixed with the worm wheel and means to move the carriage with relation to the cutter.

4. In a machine tool having a rotating cutter, a work carriage, means to progressively index a piece of work in relation to the cutter comprising a shaft, an index plate on the shaft, a spindle coaxial with the shaft, a settable detent on the spindle selectively engageable with the index plate, a worm on the spindle, a worm wheel meshing with the worm, a work spindle fixed with the worm wheel, means to move the carriage with relation to the cutter, and means to vary the rate of movement of the carriage with relation to the cutter.

5. In a machine tool, a work carriage, guide means for the carriage, and means to move the carriage, said means comprising a pre-settable lever having a slot, a slide moveable in the slot, a nut carried by the slide, screw means carried by the carriage to feed the nut, and drive means to rotate the screw means, a rotatable work shaft journaled in the carriage, a worm wheel on said work shaft and a worm for driving the worm wheel.

ANDREW HAXTON.